3,142,678
AMINO SUBSTITUTED PENTHIENOINDOLES
Leonard M. Rice, Baltimore, Md., and Meier E. Freed, Philadelphia, and Elisabeth Hertz, Bryn Mawr, Pa., assignors to American Home Products Corporation, New York, N.Y., a corporation of Delaware
No Drawing. Filed Jan. 9, 1962, Ser. No. 165,248
10 Claims. (Cl. 260—247.1)

This invention relates to new N-substituted derivatives of penthienoindole having valuable pharmacological properties.

Penthienoindole has the formula

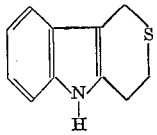

and may also be designed by the somewhat more cumbersome name of 1,3,4,5-tetrahydrothiopyrano[4,3-b]indole. The compounds of this invention have useful central nervous system activity and are valuable as antidepressants, as inhibitors of appetite (especially in combination with amphetamine or other phenethylamine derivatives), and as antihistamines. Additionally, they have useful ataractic or tranquilizing action.

The compounds of this invention are N-(aminoalkyl)-substituted penthienoindoles, and may be represented by the following formula

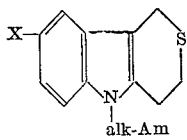

where X may be hydrogen, chlorine, fluorine, methyl, nitro, amino, or methoxyl, alk represents an alkylene biradical having a carbon chain of from two to six carbon atoms between its points of attachment, which chain may be substituted at any point by one or more lower alkyl radicals, and Am represents an non-aromatic amino radical containing no more than about eight carbon atoms. Preferably, alk is an ethylene, propylene, trimethylene, or tetramethylene radical, and Am is preferably amino, methylamino, dimethylamino, diethylamino, piperidino, pyrrolidino, morpholino, or N-methylpiperazino.

The compounds of this invention above defined, it will be noted, are bases, and are preferably administered in the form of their acid-addition salts with pharmaceutically acceptable acids, which acids may include hydrochloric, hydrobromic, sulfuric, phosphoric, citric, maleic, malic, propionic, acetic, fumaric, benzoic, succinic, and salicyclic acids. The compounds of this invention, ordinarily in the form of their said acid-addition salts, may be administered either orally or parenterally after being combined with suitable solvents, diluents, fillers, etc.

The novel bases of this invention are conveniently made by reaction of a sodio-penthienoindole (prepared by reaction of a penthienoindole with a suspension of sodium hydride in dimethylformamide) with a suitable aminoalkyl halide, such as a bromide or chloride. Among aminoalkyl halides suitable for use in this invention may be mentioned 3-dimethylaminopropyl chloride, 2-dimethylaminoethyl chloride, N - (2 - chloroethyl) - piperidine, 2-dimethylaminopropyl chloride, N-(2-chloroethyl)-pyrrolidine, 2-methyl-3-dimethylaminopropyl chloride, 2-diethylaminoethyl chloride, 3-dipropylaminopropyl bromide, 6-dimethylaminohexyl chloride, 2-dibutylaminoethyl bromide, N - methyl - N' - (3-chloropropyl)-piperazine, and N-(3-chloropropyl)-piperazine.

An alternative method of wide applicability for preparing compounds of this invention comprises reacting a penthienoindole (preferably in the form of its sodio derivatives) with an alkylene dihalide, such as ethylene dichloride, ethylene dibromide, ethylene chlorobromide, trimethylene dibromide, trimethylene dichloride, trimethylene chlorobromide, tetramethylene dibromide, etc., to form an intermediate N-(ω-haloalkyl)penthienoindole, and thereafter reacting said N-(ω-haloalkyl)penthienoindole with ammonia, a primary amine, or a secondary amine to form an N-(ω-aminoalkyl)penthienoindole; in this method it is generally preferable to employ a secondary amine in the second reaction step, so that the product is a tertiary amine.

Compounds of this invention wherein the benzene ring is substituted by chlorine, fluorine, methyl, methoxyl, or nitro are prepared analogously from the corresponding aromatic-ring substituted penthienoindoles.

Compounds of this invention in which the benzene ring is substituted by amino are preferably made by reduction of the corresponding nitro compound; this reduction can be effected either with stannous chloride or by nickel-catalyzed hydrogenation.

Compounds of this invention in which Am is primary amino and alk is the trimethylene radical or the 2-methyltrimethylene radical may be prepared by suitable reduction of an acrylonitrile-penthienoindole or a methacrylonitrile-penthienoindole adduct, respectively.

Compounds of this invention in which alk is trimethylene and Am is monoalkylamino may be made from acrylonitrile-penthienoindole adducts by hydrolysis-esterification of the nitrile function, amidation of the resulting ester with an alcoholic solution of the appropriate monoalkylamine, and finally lithium aluminum hydride reduction of the resulting monoalkylamide. In like manner, methacrylonitrile-penthienoindole adducts may be treated to give the corresponding compounds with a methyl substitution on the trimethylene chain.

Compounds of this invention in which Am is a hydroxyalkylamino group, a bishydroxyalkylamino group, or an N-alkyl-N-hydroxyalkylamino group may be made by hydroxyalkylation of compounds of this invention in which Am is a primary amino radical or a secondary amino radical by means of a suitable alkylene oxide, alkylene halohydrin, or alkylene carbonate. Especially suitable hydroxyalkylating agents are ethylene oxide, ethylene chlorohydrin, and ethylene carbonate. Compounds of this invention wherein Am is a piperazino radical may be converted to compounds of the invention in which Am is a hydroxyethylpiperazino radical by treatment with ethylene oxide, ethylene chlorohydrin, or ethylene carbonate.

The following examples illustrate the practice of this invention.

EXAMPLE I

N-(3-Dimethylaminopropyl)-Penthienoindole

N-(3-dimethylaminopropyl)-penthienoindole is made by adding 9.5 g. of penthienoindole dissolved in 50 ml. of dimethylformamide to a stirred suspension of 3 g. of sodium hydride in 50 ml. of dimethylformamide. The mixture is warmed to about 35° C., stirred for one hour, and cooled to room temperature. Six grams of freshly distilled 3-dimethylaminopropyl chloride is added, the mixture stirred at 30° C. for about twelve hours, poured into ice water, and acidified with dilute hydrochloric acid. The acidified reaction mixture is washed with ether, made basic, and extracted with ether. The ether extract is washed with brine, dried, and treated with dry hydrogen chloride. A hydrochloride salt separates, is washed with acetone, and dried; M.Pt. 199–200° C.

Analysis:

|  | Cl | N | S |
|---|---|---|---|
| Calculated for: $C_{16}H_{22}N_2S \cdot HCl$ | 11.42 | 9.03 | 10.30 |
| Found | 11.33 | 9.24 | 9.5 |

EXAMPLE 2

N-(2-Dimethylaminoethyl)-Penthienoindole

N-(2-dimethylaminoethyl)-penthienoindole is prepared as follows:

A solution of 9.46 g. of penthienoindole in 50 ml. of dimethyl formamide is added slowly to a stirred suspension of 3.0 g. of sodium hydride dispersion (48%) in 25 ml. of the same solvent. After about 30 minutes 5.38 g. of 2-dimethylaminoethyl chloride is added dropwise. The reaction mixture is stirred at 30–35° C. for twelve hours and then poured into 150 ml. of ice water. After the addition of 15 ml. of concentrated hydrochloric acid the solution is extracted with ether. The aqueous fraction is then made basic by the addition of 30 ml. of 40% sodium hydroxide. This is then extracted well with ether, and the ether layer washed with brine and dried. The dried ether extract is concentrated. The residue is dissolved in acetone (60 ml.) and added to a hot solution of 4.8 g. of fumaric acid in 375 ml. of acetone. After cooling, the precipitated product is collected on a funnel, washed with acetone, dried, and recrystallized from methanol. The fumaric acid salt melts at 200–201° C.

Analysis:

|  | C | H | N | S |
|---|---|---|---|---|
| Calculated for: $C_{19}H_{24}O_4N_2S$ | 60.61 | 6.43 | 7.44 | 8.52 |
| Found | 60.55 | 6.40 | 7.61 | 8.0 |

EXAMPLE 3

N-(2-Piperidinoethyl)-Penthienoindole

N-(2-piperidinoethyl)-penthienoindole is made from penthienoindole and N-(2-chloroethyl)-piperidine, following the general procedure of Example 2. The fumarate melts at 217–220° C.

Analysis:

|  | C | H | N | S |
|---|---|---|---|---|
| Calculated for: $C_{22}H_{28}N_2O_4S$ | 63.43 | 6.78 | 6.73 | 7.69 |
| Found | 63.36 | 6.87 | 6.43 | 7.49 |

EXAMPLE 4

N-(2-Dimethylaminopropyl)-Penthienoindole

N-(2-dimethylaminopropyl)-penthienoindole is made from penthienoindole and 2-dimethylaminopropyl chloride, following the procedure of Example 2. The fumarate melts at 169.5–172° C.

Analysis:

|  | C | H | N |
|---|---|---|---|
| Calculated for: $C_{20}H_{26}O_4N_2S$ | 61.51 | 6.71 | 7.18 |
| Found | 61.27 | 6.55 | 6.99 |

EXAMPLE 5

N-(2-Pyrrolidinoethyl)-Penthienoindole

N-(2-pyrrolidinoethyl)-penthienoindole is made from penthienoindole and N-(2-chloroethyl)-pyrrolidine in a similar manner. The fumarate melts at 222–224° C.

Analysis:

|  | C | H | N |
|---|---|---|---|
| Calculated for: $C_{21}H_{26}N_2O_4S$ | 62.66 | 6.51 | 6.96 |
| Found | 62.38 | 6.36 | 7.11 |

EXAMPLE 6

N-(2-Morpholinoethyl)-Penthienoindole

N-(2-morpholinoethyl)-penthienoindole is made similarly from penthienoindole and N-(2-chloroethyl)-morpholine. The fumarate melts at 189–191° C.

Analysis:

|  | C | H | N |
|---|---|---|---|
| Calculated for: $C_{21}H_{26}N_2O_5S$ | 60.26 | 6.26 | 6.70 |
| Found | 60.00 | 6.54 | 6.54 |

EXAMPLE 7

N-(2-Diethylaminoethyl)-Penthienoindole

N-(2-diethylaminoethyl)-penthienoindole is made similarly from penthienoindole and 2-diethylaminoethyl chloride. The fumarate melts at 174–177° C.

Analysis:

|  | C | H | N |
|---|---|---|---|
| Calculated for: $C_{21}H_{28}N_2O_4S$ | 62.35 | 6.98 | 6.93 |
| Found | 62.48 | 7.10 | 6.91 |

EXAMPLE 8

N-(3-Dipropylaminopropyl)-Penthienoindole

N-(3-dipropylaminopropyl)-penthienoindole is prepared in essentially the same manner as described in Example 2, from penthienoindole and 3-dipropylaminopropyl chloride. The fumaric acid salt melts at 150–153.5° C. (dec.).

Analysis:

|  | C | H | N |
|---|---|---|---|
| Calculated for: $C_{24}H_{34}N_2O_4S$ | 64.54 | 7.67 | 6.27 |
| Found | 64.64 | 7.59 | 6.46 |

EXAMPLE 9

N-(6-Dimethylaminohexyl)-Penthienoindole

N-(6-dimethylaminohexyl)-penthienoindole is prepared in essentially the same manner as described in Example 2, from penthienoindole and 6-dimethylaminohexyl chloride. The fumaric acid salt, crystallized from methanol-ether, melts at 103–107° C.

Analysis:

|  | C | H | S |
|---|---|---|---|
| Calculated for: $C_{23}H_{32}N_2O_4S$ | 63.86 | 7.46 | 7.41 |
| Found | 63.63 | 7.66 | 7.20 |

EXAMPLE 10

By the procedure of Example 2, N-(3-diethylaminopropyl)-penthienoindole is prepared from 3-diethylaminopropyl chloride and N-sodio-penthienoindole.

EXAMPLE 11

By the procedure of Example 2, N-(6-diethylaminohexyl)-penthienoindole is prepared from 6-diethylaminohexyl chloride and N-sodio-penthienoindole.

EXAMPLE 12

By the procedure of Example 2, N-(2-dibutylaminoethyl)-penthienoindole is prepared from 2-dibutylaminoethyl chloride and N-sodio-penthienoindole.

EXAMPLE 13

By the procedure of Example 2, N-[3-(4-methyl)-piperazinopropyl]-penthienoindole is prepared from N-methyl - N' - 3 - chloropropylpiperazine and N-sodio-penthienoindole.

EXAMPLE 14

By the procedure of Example 2, N-(3-piperazinopropyl)penthienoindole is prepared from N-sodio-penthienoindole.

EXAMPLE 15

By the procedure of Example 2, N-[3-(2-hydroxyethyl-piperazinopropyl)]penthienoindole is prepared from N-2-hydroxyethyl - N'-3-chloropropylpiperazine and N-sodio-penthienoindole.

EXAMPLE 16

By the procedure of Example 2, 8-chloro-N-(3-dimethylaminopropyl) - penthienoindole is prepared from 3-dimethylaminopropyl chloride and 8-chloro - N - sodio-penthienoinodole.

EXAMPLE 17

By the procedure of Example 2, 8-methyl-N-(3-dimethylaminopropyl)-penthienoindole is prepared from 8-methyl-N - sodio - penthienoindole and 3-dimethylaminopropyl chloride.

EXAMPLE 18

By the procedure of Example 2, 8-nitro-N-(3-dimethylaminopropyl)-penthienoindole is prepared from 8-nitro-N - sodio - penthienoindole and 3 - dimethylaminopropyl chloride.

EXAMPLE 19

8-amino-N-(3-dimethylaminopropyl) - penthienoindole is prepared from 8 - nitro - N - (3-dimethylaminopropyl)- penthienoindole by reduction with stannous chloride or by hydrogenation catalyzed by Raney nickel.

EXAMPLE 20

By the procedure of Example 2, 8-methoxy-N-(3-dimethylaminopropyl)-penthienoindole is prepared from 8-methoxy-N-sodio-penthienoindole and 3-dimethylaminopropyl chloride.

EXAMPLE 21

N-(3-methylaminopropyl)-penthienoindole is prepared by reduction with lithium aluminum hydride of N'-methylpenthienoindole - N - propionamide obtained from penthienoindole-N-propionic acid methyl ester and methyl amine.

EXAMPLE 22

By the procedure of Example 2, N-(3-dimethylamino-2-methylpropyl)-penthienoindole is prepared from N-sodio-penthienoindole and 3 - dimethylamino - 2 - methyl propyl chloride.

EXAMPLE 23

N-(3-aminopropyl)-penthienoindole is prepared by reduction with lithium aluminum hydride of N-cyanoethyl-penthienoindole obtained by cyanoethylation of penthienoindole.

We claim:

1. A substance selected from the group consisting of compounds having the formula

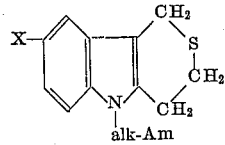

wherein X is a member of the group consisting of hydrogen, chlorine, fluorine, methyl, nitro, amino, and methoxyl, Am represents amino radical containing no more than eight carbon atoms and selected from the group consisting of amino, monoalkylamino, dialkylamino, piperidino, pyrrolidino, morpholino, and N-lower alkyl piperazino, and alk represents an alkylene having a carbon chain of from two to six atoms, and the non-toxic acid-addition salts of these compounds with pharmaceutically acceptable acids.

2. N-(3-dimethylaminopropyl)-penthienoindole.
3. N-(2-dimethylaminoethyl)-penthienoindole.
4. N-(2-piperidinoethyl)-penthienoindole.
5. N-(2-dimethylaminopropyl)-penthienoindole.
6. N-(2-pyrrolidinoethyl)-penthienoindole.
7. N-(2-morpholinoethyl)-penthienoindole.
8. N-(2-diethylaminoethyl)-penthienoindole.
9. A compound having the formula

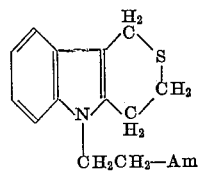

wherein Am represents an amino radical selected from the group consisting of amino, mono lower alkylamino, di lower alkylamino, piperidino, pyrrolidino, morpholino, and N-lower alkyl piperazino.

10. A compound having the formula

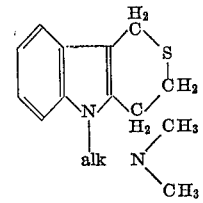

wherein alk represents alkylene having a carbon chain of from two to six carbon atoms.

No references cited.